United States Patent [19]

Almer et al.

[11] Patent Number: 4,983,672

[45] Date of Patent: Jan. 8, 1991

[54] EPOXIDE RESIN COMPOSITIONS AND METHOD

[75] Inventors: Carl J. Almer; William J. Schultz, both of St. Paul, Minn.

[73] Assignee: Minnesota Mining and Manufacturing Company, St. Paul, Minn.

[21] Appl. No.: 137,453

[22] Filed: Dec. 23, 1987

[51] Int. Cl.$^5$ .............................. C08G 39/24
[52] U.S. Cl. .............................. 525/65; 525/97; 525/122; 528/97; 528/407
[58] Field of Search .................. 528/97, 104, 407, 74, 528/190; 525/65, 97, 122

[56] References Cited

U.S. PATENT DOCUMENTS

| | | | |
|---|---|---|---|
| 2,934,521 | 4/1960 | Masters et al. | 260/47 |
| 2,951,825 | 9/1960 | Reinking et al. | 260/47 |
| 3,018,262 | 1/1962 | Schroeder | 260/29.2 |
| 3,056,762 | 10/1962 | Tringali | 260/52 |
| 3,216,970 | 11/1965 | Conix | 528/191 |
| 3,298,998 | 1/1967 | McConnell et al. | 260/47 |
| 3,546,165 | 12/1970 | Morgan | 528/191 |
| 3,894,112 | 7/1975 | Pagel | 260/830 |
| 3,894,113 | 7/1975 | Pagel | 260/836 |
| 4,331,582 | 5/1982 | Babayan | 523/453 |
| 4,430,493 | 2/1984 | Rieder | 528/190 |
| 4,524,181 | 6/1985 | Adam et al. | 525/107 |
| 4,612,350 | 9/1986 | Parker | 528/190 |
| 4,684,678 | 8/1987 | Schultz et al. | 523/466 |
| 4,707,534 | 11/1987 | Schultz | 528/97 |
| 4,786,668 | 11/1988 | Dewhirst | 528/97 |
| 4,786,669 | 11/1988 | Dewhirst | 528/97 |
| 4,806,618 | 2/1989 | Imai et al. | 528/190 |

FOREIGN PATENT DOCUMENTS

| | | |
|---|---|---|
| 2730188 | 7/1989 | Australia . |
| 249262 | 4/1981 | European Pat. Off. . |
| 92336 | 10/1983 | European Pat. Off. . |
| 262746 | 3/1985 | European Pat. Off. . |
| 203828 | 12/1986 | European Pat. Off. . |
| 63-218725 | 9/1988 | Japan . |
| 226159 | 9/1968 | U.S.S.R. . |

OTHER PUBLICATIONS

L. D. Bravenec et al., "Lightly Crosslinked Thermosets", 33 Int'l. SAMPE Symposium, Mar. 7-10, 1988, 1377.

S. C. Lin et al, "Epoxy Resins II . . . and Their Copolymers", J. Polym. Sci. 1979, 17, 3095.

C. S. Chen et al, "New Epoxy Resins I . . . System", J. Appl. Polym. Sci. 1982, 27, 1177.

C. S. Chen et al, "New Epoxy Resin II . . . Copolymers", J. Appl. Polym. Sci., 1982, 27, 3289.

Toughenable Epoxy Matrix Resins for Advanced Composites by Ronald S. Bauer; 18th International SAMPE Technical Conf., Oct. 7-9, 1986.

Epoxy Resin Systems for Use in High Performance Applications at Elevated Temperatures by Bauer et al; 32nd International SAMPE Symposium; Apr. 9-9, 1986.

Formulation and Characterization of Epoxy Resin Copolymer for Graphite Composites; NASA Contractor Report 166501; Fred L. Keck.

AF-563 Structural Adhesive Film; Scotch-Weld 3M; Introductory Data Mar. 1, 1988; 3M Aerospace Materials Department.

Low Flammability Epoxy Polymers Via 9,9-Bis(4,-4'-Aminophenyl)Fluorene; Jeffrey C. Holloway; Aug. 1984.

(Kourteidse and Parker, 1979), *Advanced Thermoset Resins for Fire-Resistant Composites*, pp. 551-593 (1979).

Kourtides and Parker, *Thermoset Resins for Fire Resistant Composites*, pp. 586-588.

Kourtides and Parker, "Advanced Resin Matrices . . ." NASA Publication.

(NASA Technical Brief, Mar. 1984).

*Primary Examiner*—Veronica P. Hoke
*Attorney, Agent, or Firm*—Merchant, Gould, Smith, Edell, Welter & Schmidt

[57] ABSTRACT

A method of improving epoxy resin compositions to provide a cured resin having improved glass transition temperature and toughness characteristics is provided. The method includes providing in an epoxy resin composition an effective amount of a 9,9-bis(hydroxphenyl)-fluorene composition. The fluorene component acts as a chain extension agent and provides for increased glass transition temperature and less cross-link density. As a result, improved toughness occurs. In preferred applications a toughening agent is provided in the resin composition, to further enhance toughness. Preferred resin compositions, cured resins and methods of providing improved cured resins are also provided.

34 Claims, No Drawings

EPOXIDE RESIN COMPOSITIONS AND METHOD

FIELD OF THE INVENTION

The present invention relates to epoxy resin compositions, and in particular to epoxy resin compositions which when cured exhibit preferred physical and chemical characteristics. Specifically, epoxy resin compositions according to the invention cure to exhibit relatively high glass transition temperatures and high ductility or toughness characteristics.

BACKGROUND OF THE INVENTION

Epoxy resins are monomers or pre-polymers that react with curing agents, through the epoxy functional ring, to yield high performance cured resins. Such resins, for example, are widely utilized as: protective coatings for electrical insulation; composite matrix resins; and, as structural adhesives, due to their combination of desired chemical and physical characteristics, such as thermal and chemical resistance, adhesion retention and abrasion resistance.

Epoxy resins generally include a plurality of epoxy or oxirane groups. The epoxy groups can react to form a network, typically either through homopolymerization or through addition polymerization with an epoxy curing agent. As used herein, the term "epoxy curing agent" is meant to refer to an agent (or mixture of agents) having three or more reactive sites available for reaction with oxirane groups. As a result of such a structure, an epoxy curing agent can generate a network; i.e. a significantly cross-linked system.

Epoxy curing agents are to be distinguished from compounds referred to herein as merely chain extension agents. As used herein, the term "chain extension agent" is meant to refer to a compound which has only 2 sites capable of reaction with oxirane groups. During polymerization, a chain extension agent will typically become lodged between epoxy resin chains, extending same. Little cross-linking occurs, however, since the chain extension agent does not include a third reactive site.

As used herein, the term "catalyst" is meant to refer to a compound capable of catalyzing polymerization of a di-epoxy resin-compound with substantial networking or cross-linking. Generally, this occurs through generation of anionic or cationic polymerization reactions, typically involving the oxirane moiety. During polymerization in the presence of a catalyst, a di-epoxy compound is capable of reacting at four sites, and thus substantial cross-linking can result.

An example of an epoxy curing agent is a diprimary amine, which is capable of reacting with four epoxy groups. Typical chain extension agents include diphenols, such as resorcinol or bisphenol A. Catalysts include Lewis acids, tertiary amines and imidazoles.

Throughout this specification, "catalysts" and "epoxy curing agents" will be referred to collectively as "epoxy curatives" or "curatives".

Frequently, it is desired that the cured product have a relatively high glass transition temperature (Tg). The glass transition temperature is the temperature at which the cured resin changes from a relatively strong, high modulus, hard, vitreous state to a low modulus, pliable, elastic state. In general, if it is intended that the cured resin be strong at relatively high temperatures, then a relatively high glass transition temperature will be necessary.

A commonly used method of obtaining an improved or higher glass transition temperature is through preparation of a cured resin having a high concentration or degree of cross-linking, or a relatively high concentration of polar groups. A method of achieving high cross-linking is to use an epoxy curing agent having a high level of functionality, or an active homopolymerization agent. In U.S. Pat. No. 4,331,582, incorporated herein by reference, it is taught that bis[4-(N,N-diglycidylamino)phenyl]methane (TGDDM) may be cured with di(4-aminophenyl)sulfone (DDS), to yield a cured resin having a high cross-link density.

Resins having a high cross-link density have several shortcomings. For example, such materials are typically very brittle, and thus undesirable for many applications. That is, the materials are not very tough or ductile. Also, especially if a high concentration of polar groups is utilized to help obtain high glass temperature, the cured polymer may not be satisfactorily stable to moisture.

Generally, to obtain a relatively tough cured resin, it is desired to utilize a composition which exhibits a high degree of cure, and for which, following curing for a reasonably short period of time, a very high percentage of epoxy resin will have reacted to form extended chains within the polymer network. Generally, a high concentration of chain extension agent, such as diphenol, can be utilized to accomplish a high degree of cure. Examples are indicated in U.S. Pat. Nos. 2,934,521 and 3,056,762, the disclosures of which are incorporated herein by reference. A problem with such conventional uses of chain extension agents is that while the resulting resins exhibit a relatively high degree of curing and toughness or ductility, generally the glass transition temperature for the cured product is relatively low, because of low cross-link density.

A substituted fluorene, in particular 9,9-bis(4,4'-hydroxyphenyl)fluorene, is known to react with conventional epoxy polymers, see for example Holloway, Jeffrey G., *Low Flammability Epoxy Polymers Via 9,9-Bis(4,4'-Aminophenyl)Fluorene*, p. 14, Master's Thesis, San Jose State U. (1984), incorporated herein by reference. A class of compounds which include the above-named substituted fluorene is used, as described below, in preferred embodiments of the present invention, to yield advantages in certain resin compositions.

What has been needed has been a readily curable epoxy resin composition for providing a cured resin having both high glass transition temperature and improved toughness or ductility; i.e. achievement of high glass transition temperature without high cross-link density or polarity which may cause brittleness and/or instability to water. Preferably, the desired features are attainable in a resin composition readily cured by a readily available and effective agent. Also, methods have been needed whereby: improved or higher glass transition temperature for a cured resin composite can be generated without substantial loss of toughness; and/or, improved or higher toughness can be obtained without substantial lowering of glass transition temperature.

OBJECTS OF THE INVENTION

An object of the present invention is to provide a resin composition capable of being cured to form a resin having a relatively high glass transition temperature with relatively high toughness.

It is another object of the present invention to provide a method by which an epoxy resin can be cured to a resin having a relatively high glass transition temperature and a relatively high toughness.

It is another object to the present invention to provide a method by which an epoxy resin composition can be improved to cure to a cured state having improved (higher) glass transition temperature without substantial loss of toughness, and preferably with improved toughness.

It is another object of the present invention to provide a method by which an epoxy resin composition can be improved to cure to a cured state having improved toughness without any substantial lowering of glass transition temperature, and preferably with higher glass transition temperature.

It is yet another object of the present invention to provide a preferred cured resin exhibiting relatively high toughness and relatively high glass transition temperature, formed through the utilization of a bis(hydroxyphenyl) substituted fluorene compound as a chain extension agent, preferably in conjunction with an epoxy curative, such as a curing agent or catalyst.

Another object of the invention is to provide a preferred curable epoxy resin composition for use as a film adhesive.

Other objects and advantages of the present invention will become apparent from the following descriptions wherein are set forth by way of illustration and example detailed embodiments of the present invention.

SUMMARY OF THE INVENTION

According to the present invention, fluorene-containing bisphenols are provided in a resin composition with a polyepoxide to form, upon curing, a cured resin exhibiting either: improved glass transition temperature; improved toughness; or both. Generally this is accomplished through use of fluorene-containing bisphenol(s) in the presence of a conventional epoxy curative. The terms "high glass transition temperature" or "improved glass transition temperature" as used herein are intended to refer to cured compositions whose Tg has been increased through application of the present invention. The terms "high" or "improved" toughness are meant to refer to cured compositions exhibiting increased shear strength and/or peel strength, relative to unimproved compositions. That is, typically conventional methods of improving glass transition temperature involve loss of toughness. When, according to the present invention, an epoxy resin composition is provided with an improved glass transition temperature, through inclusion of a chain extension agent therein, without substantial loss of toughness, i.e. no greater than about 20% lowering in shear strength, at ambient temperature and pressure, the resin composition will be understood to be improved. In the alternative, when an epoxy resin is provided with an improvement in toughness, through inclusion of a chain extension agent therein, without substantial lowering of Tg (<typically about a 25° drop), the resin composition will also be understood to have been improved.

In preferred applications of the present invention a toughening agent is used in combination with a chain extension agent to achieve a unique improvement in toughness, along with an improvement in glass transition temperature. This will be understood from examples described herein.

For preferred compositions according to the present invention, the glass transition temperature is at least 120° C., and the fracture energy at least about 100 Joules/m². An improvement in Tg of at least 25° C. without any substantial (typically greater than about 20%) loss in toughness as evidenced by peel strength and/or fracture energy generally defines a noticeably improved composition according to the invention. In the alternative, an improvement of at least about 20 Joules/m² in fracture energy at ambient temperature and pressure, without any substantial loss (typically greater than about 25°) in Tg also generally defines a noticeably improved composition according to the invention. It will be understood that the amount of Tg and fracture energy change which amounts to a "substantial" change will, in part, depend upon the absolute values of the Tg or fracture energy in the unimproved composition. The above stated figures are intended to be representational for commonly used systems.

A variety of epoxy resins may be utilized in improved resin compositions according to the present invention, including both aromatic and aliphatic epoxy resins. Also, a variety of fluorene-containing bisphenol compositions (including mixtures) may be utilized, generally including compounds according to the following formula:

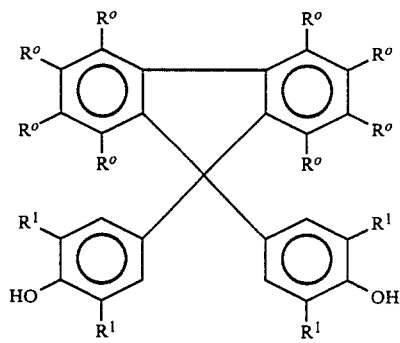

wherein: each $R^0$ and $R^1$ is independently selected from hydrogen and other groups substantially inert to the polymerization of epoxide group-containing compounds; for example $R^0$ is preferably selected from the group comprising: H (hydrogen), the halogens (F, Cl, Br and I); linear and branched alkyl groups having 1-6 carbon atoms, phenyl groups, nitro groups, acetyl groups, and trimethylsilyl groups; and, each $R^1$ is preferably independently selected from the group comprising: hydrogen (H), phenyl, the halogens, and linear and branched alkyl groups having 1-6 carbon atoms. When it is said that $R^0$ and $R^1$ are "independently" selected, it is meant that there is no requirement that all $R^0$ be the same, or that all $R^1$ be the same. The terms "fluorene-containing bisphenol composition", "9,9-bis(hydroxyphenyl)fluorene composition" and variants thereof are meant to refer to single compounds and mixtures of compounds according to the above formula.

It is noted that the diamino-analogue to the above described compound is also a chain-extension agent. This compound and its use to improve epoxy resins is the subject of U.S. Pat. No. 4,684,678. That patent is owned by the assignee of the present invention, Minnesota Mining and Manufacturing Co., St. Paul, Minn. In general, the di-hydroxy compound is preferred, in part because it is less reactive with epoxy compounds than is the diamine. That is, the resin composition is more readily stored, handled, and applied, prior to cure, when the di-hydroxy agent is used. Also, the di-hydroxy compound generally dissolves better in the resin composition mixture.

There is no universal agreement on the terminology to be utilized in the field of epoxy resins. The term "epoxy resin" has been used to indicate both: any molecule containing at least one group having a 3-member oxirane ring; and, also, both uncured and cured compositions. That is, the cured resin is often referred to as an "epoxy resin" even though the epoxy groups may have been reacted and destroyed during the curing process.

Herein, the term "polyepoxide resin" refers to a molecule that contains, or contained prior to reaction, more than one oxirane ring. Generally, herein the term "epoxy resin composition" refers to the uncured composition which, upon curing, cures to a "cured epoxy resin". When it is said herein that an epoxy resin composition "includes" or "comprises" it is meant that the composition either: comprises a mixture of the components unreacted; or, includes resulting polymer or polymer material formed from polymer-forming reaction(s) of those components, to leave residue(s) therefrom in the polymer; or the composition includes both.

Preferred epoxy resin compositions according to the present invention include an effective amount of a toughening agent therein. A variety of toughening agents are well-known. They generally comprise elastomer molecules and similar compounds which are incorporated into the resin composition but which do not necessarily become chemically involved in the curing process. That is, the compounds may sometimes remain independent in the matrix defined by the cured resin. The presence of the compounds imparts preferred physical characteristics to the cured resin, relating generally to decreased brittleness and increased toughness. In some instances, the toughening agent may be chemically incorporated into the epoxy resin itself, for example as a substituent on the epoxy-containing component. An "effective" amount of a toughening agent is an amount effective to impart an improvement in toughness to the cured resin composition. This may be characterized as an improvement of at least about 20% in the peel strength, at ambient temperature and pressure. The term "toughening agent" and variants thereof, as used herein, will be understood to include mixtures containing a plurality of such agents.

According to the present invention, a method of improving an epoxy resin composition, whereby a resulting cured epoxy resin is provided with improved glass transition temperature and improved toughness, comprises provision of a chain extension agent comprising a 9,9-bis(hydroxyphenyl) fluorene component in an effective amount in the epoxy resin composition. An "effective amount" of the 9,9-bis(hydroxyphenyl)fluorene is an amount sufficient to impart improvement in Tg and/or toughness of the cured resin composition, as above defined. Preferably, as above indicated, a toughening agent is also provided.

As previously indicated, in preferred applications of the present invention an epoxy resin composition is provided with both: a 9,9-bis(hydroxyphenyl)fluorene component; and, an epoxy curative component. In this manner, the difunctional fluorene component may be used to increase epoxy resin chain length, without introduction of increased cross-linking. The curative, on the other hand, is used to introduce sufficient cross-linking to result in strength and integrity of cured resin. Typically, the amount of 9,9-bis(hydroxyphenyl)fluorene utilized is such that about 5–90% and about 9–70%, of reactive oxirane rings in the epoxy resin will react with active hydroxy-groups provided by the substituted fluorene component. Preferably less than 50% of the oxirane units are reacted with the substitute fluorene, for many applications. Generally, both the substituted fluorene and the epoxy resin are di-functional with respect to this reaction, thus the ratio of reactive epoxy resin molecules to reactive fluorene compound should be between about 1:0.05 and 1:0.9, and typically about 1:0.09–1:0.7. By "di-functional" it is meant that each epoxy resin molecule includes only two reactive oxirane moieties, and each 9,9-bis(hydroxyphenyl)fluorene molecule includes only two reactive hydroxy groups.

The amount of curative used will depend on its degree of reactivity and in some instances its relative reactivity with respect to the fluorene component. Generally, it should be selected and used in an amount sufficient or effective for reaction with a substantial amount of remaining reactive oxirane moieties in the epoxy resin, i.e. those epoxy or oxirane moieties in excess of the reactive hydroxy-moieties on the fluorene component. The term "a substantial amount" as used herein, in this context, is meant an amount sufficient to generate enough cross-linking to result in a cured polymer having the desired Tg and toughness. As an example, if a curative capable of reacting with 3 oxirane units were selected, it could be used in a molecular ratio of about 2:3 with the excess epoxy resin; i.e. that amount of epoxy resin in excess over the fluorene component. It is noted that mixtures of curatives may be used, including mixtures of components having differing reactivities or available reactive sites for cross-linking. The term "curative" as used herein is meant to include mixtures of curatives.

The result of the above is generally improved cured resins. Also, the resin composition is made particularly susceptible to enhancements by toughening agents. A reason for this may be that the lengths of epoxy-chain units, or polymer backbone, between cross-links is generally increased, by comparison to non-improved resins. A result is that the polymer can distort around the toughener, leading to better or enhanced incorporation of the toughener with resulting beneficial effects therefrom.

In a typical process according to the present invention, the epoxy resin composition is prepared and is heated to the appropriate curing temperature, for a length of time sufficient to substantially completely cure the composition. Generally, preparation of the composition involves a pre-dispersing of any toughening agent in the epoxide compound, followed by mixing of the resulting toughener/epoxide mix with the chain extension agent (i.e. the 9,9-bis(hydroxyphenyl)fluorene composition) and curative. Preferred compositions according to the present invention can be cured between the temperatures of about 50° C. and about 300° C. In conventional manners curing temperature cycles may be applied, to facilitate curing in a desired manner and at a selected rate. Typically, it is desired to have complete curing within a time period of about 10 minutes to 12 hours (overnight).

The cured resin may be effectively used as a bonding film or film adhesive in a variety of applications. Typically, they will be used as adhesive films between first and second substrates, to form a film/substrate arrangement. For example, the adhesive might be used to attach aluminum skins to an airplane framework. In general, the resin compositions can be readily applied as films, and then cured. Preferably, the bonding film is made about 0.0005–0.030 inches (0.001–0.007 cm) thick.

A typical polyepoxide usable in compositions according to the present invention is 2,2-bis-[4-(2,3-epoxypropoxy)phenyl]propane, compound II below:

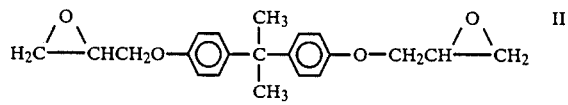

Upon curing in the presence of a fluorene composition according to the present invention, an epoxide resin including such units as III below will result.

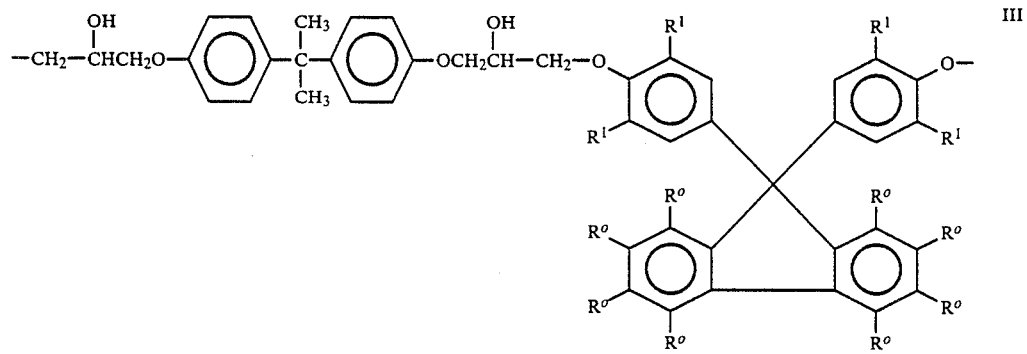

By formula III, it is not meant to suggest that the cured resin comprises only alternating epoxy unit and fluorene unit, but rather that both are included in the cured resin, generally in the alternating manner. As indicated previously, a substantial amount of the epoxy resin oxirane units will have reacted to form crosslinking, as a result of the curative. The amount of oxirane units linked to substitute fluorene may be varied considerably. However generally, for typical applications about 5–90%, and preferably about 9–50%, of the oxirane units will be linked to a substituted fluorene compound as indicated at III above.

DETAILED DESCRIPTION OF THE PREFERRED AND ALTERNATE EMBODIMENTS

As required, detailed embodiments of the present invention are described in detail herein. It is to be understood, however, that the details provided are only exemplary of the invention, which may be embodied in various forms. Therefore, the specific details disclosed herein are not to be interpreted as limiting, but rather as a basis for the claims and as a representative basis for teaching one skilled in the art to variously employ the present invention in virtually any appropriate system, arrangement or manner.

Preferred improved epoxy resin compositions according to the present invention include: polyepoxides or residue therefrom; a chain extension agent composition, or residue therefrom (i.e. the fluorene-containing bisphenol component); tougheners; and, curative, or residue therefrom (curing agent and/or catalyst), as follows:

The Epoxide Constituent

For preferred compositions according to the present invention, the epoxide constituent comprises any of a variety of polyepoxides, and may include mixtures. It will be understood that the scope of the terms used herein in discussion of this component, and other components, in the resin composition are meant to include residues from reaction or partial reaction with other components to for polymeric structures. Polyepoxides are well known. Preferred aromatic polyepoxides for use according to the present invention include: the polyglycidyl ethers of polyhydric phenols; glycidyl esters of aromatic carboxylic acids; N-glycidylaminobenzenes; and, glycidylaminoglycidyloxybenzenes.

Examples of N-glycidylaminobenzenes suitable for use in the epoxy resin compositions of the present invention include the di-and polyglycidyl derivatives of: benzeneamine; benzene diamines; naphthylenamine; and, naphthylene diamines. Such compounds include: N,N-diglycidylbenzeneamine; N,N-diglycidylnaphthalenamine; 1,4-bis(N-glycidylamino)benzene; and, 1,3-bis(N,N-glycidylamino)benzene. The polyglycidyl derivatives of aromatic aminophenols are described in U.S. Pat. No. 2,951,825, incorporated herein by reference. An example of these compounds is N,N-diglycidyl-4-glycidyloxybenzeneamine.

Aliphatic polyepoxides may also be used, and are well known. Most preferably, the aromatic polyepoxides used in resin compositions according to the invention are the polyglycidyl ethers of polyhydric phenols. The preferred aliphatic epoxides are the diglycidylethers of cyclohexane dimethanol.

The polyepoxides are exemplified by the following: vinyl cyclohexene dioxide; epoxidized mono-, di- and triglycerides; butadiene dioxide; 1,4-bis(2,3-epoxypropoxy)benzene; 1,3-bis(2,3-epoxypropoxy)benzene; 4,4'-bis(2,3-epoxypropoxy)diphenyl ether; 1,8-bis(2,3-epoxypropoxy)octane; 1,4-bis(2,3-epoxypropoxy)cyclohexane; 4,4'-bis(2-hydroxy-3,4-epoxybutoxy)diphenyl dimethane; 1,3-bis(4,5-epoxypentoxy)-5-chlorobenzene; 1,4-bis(3,4-epoxybutoxy)-2-chlorocyclohexane; diglycidyl thioether; diglycidyl ether; 1,2,5,6-diepoxy-hexyne-3; and, 1,2,5,6-diepoxyhexane. Other usable epoxides are found in *Handbook of Epoxy Resins*, Lee and Neville, McGraw-Hill, New York (1967), and U.S. Pat. No. 3,018,262, incorporated herein by reference. Some compounds include epoxides listed in U.S. Pat. No. 3,298,998, incorporated herein by reference. These compounds include:
bis[p-(2,3-epoxypropoxy)phenyl]cyclohexane;
2,2-bis[p-(2,3-epoxypropoxy)phenyl]norcamphane;

5,5-bis[(2,3-epoxypropoxy)phenyl]hexahydro-4,7-methanoindane;

2,2-bis[4-(2,3-epoxypropoxy)-3-methylphenyl]hexahydro-4,7-methanoindane; and, 2-bis[p-2,3-epoxypropoxy)phenyl]-methylene-3-methylnorcamphane.

The Chain Extension Agent

The chain extension agent usable according to the present invention is a 9,9-bis(hydroxyphenyl)fluorene composition and preferably includes at least one compound of the general formula IV, as follows:

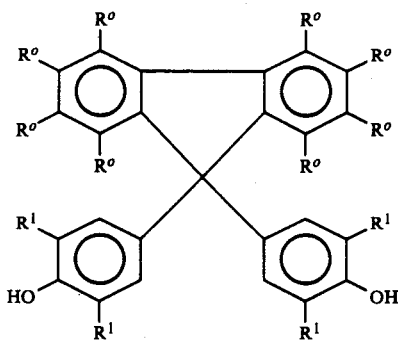

wherein: each $R^0$ and $R^1$ is independently selected from substituents non-reactive with epoxy groups in the resin; for example: each $R^0$ is preferably independently selected from the group comprising hydrogen (H); the halogen (F, Cl, Br and I); linear or branched alkyl groups having 1-6 carbon atoms; phenyl-; nitro-; acetyl-; and trimethylsilyl-; and, each $R^1$ is independently selected from the group comprising: hydrogen (H), phenyl-; the halogens, and alkyl groups having 1-6 carbon atoms. The 9,9-bis(hydroxyphenyl)fluorene composition may include more than one compound according to formula IV.

When it is herein said that $R^0$ and $R^1$ "independently" selected, it is meant that there is no requirement that all groups $R^0$ all be the same group, or that all groups $R^1$ be the same group.

Examples of chain extension agents (bisphenol fluorenes) according to formula IV include:
9,9-bis(4-hydroxyphenyl)fluorene,
9,9-bis(3-methyl-4-hydroxyphenyl)fluorene,
9,9-bis(3-chloro-4-hydroxyphenyl)fluorene,
9,9-bis(3-ethyl-4-hydroxyphenyl)fluorene,
9,9-bis(3,5-dimethyl-4-hydroxyphenyl)fluorene,
9,9-bis(3,5-dichloro-4-hydroxyphenyl)fluorene,
2-iodo-9,9-bis(4-hydroxyphenyl)fluorene,
3-bromo-9,9-bis(4-hydroxyphenyl)fluorene,
1-chloro-9,9-bis(4-hydroxyphenyl)fluorene,
2-methyl-9,9-bis(4-hydroxyphenyl)fluorene,
2,6-dimethyl-9,9-bis(4-hydroxyphenyl)fluorene,
1,5-dimethyl-9,9-bis(4-hydroxyphenyl)fluorene,
2-fluoro-9,9-bis(4-hydroxyphenyl)fluorene,
1,2,3,4,5,6,7,8-octafluoro-9,9-bis(4-hydroxyphenyl)fluorene,
2,7-dinitro-9,9-bis(4-hydroxyphenyl)fluorene,
2-chloro-4-methyl-9,9-bis(4-hydroxyphenyl)fluorene,
2,7-dichloro-9,9-bis(4-hydroxyphenyl)fluorene,
2-acetyl-9,9-bis(4-hydroxyphenyl)fluorene,
2-chloro-9,9-bis(4-hydroxyphenyl)fluorene, and
2-t-butyl-9,9-bis(4-hydroxyphenyl)fluorene.

Mixtures of hydroxyphenyl fluorenes may be utilized as the chain extension agent, in compositions according to the present invention. Mixtures may be preferred in some instances because they often have a melting point that is lower than the melting point of an individual hydroxyphenyl fluorene, and thus facilitate curing of the epoxy resin composition at a temperature lower than might otherwise be possible.

The amount of chain extension agent used in resin compositions according to the present invention may be varied somewhat. Preferably, the amount of chain extension agent used is based on the amount of reactive epoxide functionality in the polyepoxy resin, generally according to the formula: 1 reactive hydroxy equivalent or less of bis(hydroxyphenyl)fluorene per equivalent of epoxide group present in the polyepoxide component. A wide range is possible in applications of the present invention. A range of about 0.5 to about 0.9 is preferable, as it permits a significant amount of epoxide group to react in cross-linking. A most preferred range of hydroxy equivalent to reactive epoxy or oxirane equivalent is about 0.09–0.5. The term "hydroxy equivalent" when used with respect to the fluorene-containing bisphenol is meant to refer to equivalents of reactive hydroxy groups, i.e. the 9-hydroxy groups. Reference to equivalents of epoxy group in the polyepoxide is meant to refer to reactive epoxy groups.

Curing Agents and Catalysts (Curatives)

The epoxy curatives curing agents and/or catalysts suitable for use in compositions according to the present invention include those conventionally used for curing epoxy resin compositions and forming cross-linked polymer networks. Such agents include aliphatic and aromatic primary amines, for example: di(4-aminophenyl)sulfone; di-(4-aminophenyl)ether; and 2,2-bis(4-aminophenyl)propane. Such compounds also include aliphatic and aromatic tertiary amines such as dimethylaminopropylamine and pyridine, which may act as catalysts to generate substantial cross-linking. Further, boron trifluoride complexes such as $BF_3$-monoethanolamine; imidazoles such as 2-ethyl-4-methylimidazole; hydrazides such as aminodihydrazide; guanidines such as tetramethyl guanidine; and, dicyandiamide are useful as curing agents or catalysts.

The amount of curing agent and/or catalyst needed will vary from resin to resin and is generally to be provided in such an amount as to be effective in causing substantially complete curing within a desired length of time. A typical composition according to the present invention includes about 1–30%, by weight, of curing agent. It will be understood that the final properties of the cured resin composition will be greatly influenced by the relative amounts of cross-linking and epoxy chain extension caused respectively by the curative and chain extension agent. Generally, this is set by selecting the amount of equivalents of substituted fluorene(s) as the chain extension agent, and then using an appropriate amount of curative to achieve curing at a selected rate.

The Toughening Agent

Toughening agents for use in preferred compositions of the present invention generally comprise: elastomer molecules, separate elastomer precursor molecules; combination molecules that include epoxy-resin segments and elastomeric segments; and, mixtures of such separate and combination molecules. The combination molecules may be prepared by reacting epoxy resin materials with elastomeric segments; the reaction leaving reactive functional groups, such as unreacted epoxy groups, on the reaction product. The general use of tougheners in epoxy resins is well-known, and is described in the Advances in Chemistry Series No. 208 entitled "Rubbery-Modified Thermoset Resins", edited by C. K. Riew and J. K. Gillum, American Chemical Society, Washington, 1984, the reference being incorporated herein by reference. The amount of toughening agent to be used depends in part upon the final physical characteristics of the cured resin desired, and is generally determined empirically. For a typical preferred embodiment, the toughening agent comprises 2–40% and preferably about 4–20% by weight of the resin composition.

Some useful toughening agents include: carboxylated acrylonitrile/butadiene vulcanizable elastomer precursors (such as Hycar® CTBNX and Hycar® 1072, B.F. Goodrich Chemical Co.); butadiene polymer (Hycar® CTB, B.F. Goodrich Chemical Co.); amine functional polyethers such as: HC1101 (a 10,000 MW, primary amine-terminated, compound; Minnesota Mining and Manufacturing Co.; St. Paul, Minn.), Jeffamine® (Texaco Chemical Co.); and isocyanate-functional polyethers such as: Adiprene® (Uniroyal Chemical Co.); functional acrylic rubbers including acrylic core/shell material, such as Acryloid® KM330 and 334, Rohm & Haas; and core/shell polymers, such as methacrylate-butadiene-styrene (MBS) copolymer wherein core is cross-linked styrene/butadiene rubber and shell is polymethylacrylate (Acryloid® KM653, Acryloid® KM680; Rohm and Haas).

As used above, for acrylic core/shell materials "core" will be understood to be acrylic polymer having $Tg<0°$ C. and "shell" will be understood to be an acrylic polymer having $Tg>25°$ C. Tougheners may include epoxy-terminated compounds, which can be incorporated into the polymer backbone.

A typical, preferred, list of tougheners comprises: acrylic core/shell polymers; styrenebutadiene/methacrylate core/shall polymers; polyether polymers; carboxylated acrylonitrile/butadienes; and, carboxylated butadienes.

Advantages can be obtained from the provision of the chain extension agent in a composition with an epoxy resin even in the absence of a toughening agent as described above. However, particular advantage is achieved from the presence of the toughening agent, as indicated by Example 2, and as previously suggested. It is a feature of the present invention that improved resins as disclosed herein are generally made particularly susceptible to, or are enhanced with respect to, the beneficial effects of tougheners.

Adjuvants

Various adjuvants may be added to compositions according to the present invention, to alter the characteristics of the cured composition. Included among useful adjuvants are: thixotropic agents such as fumed silica; pigments such as ferric oxide, brick dust, carbon black, and titanium oxide; fillers such as silica, magnesium sulfate, calcium sulfate, and beryllium aluminum silicate; and, clays such as bentonite. Amounts of up to about 200 parts of adjuvant per 100 parts of epoxy resin composition may be effectively utilized.

Formation and Use of the Epoxy Resin Compositions

Generally, the toughening agent is pre-dispersed in the epoxide compound. The toughener-containing epoxide is then mixed with a curative and the chain extension agent to form a substantially uniform mixture. The mixture is cured upon heating for an appropriate length of time. While the curing reaction may take place slowly at room temperature, it is preferably brought about by heating the mixture to about 50° C. to 150°–300° C. for an appropriate length of time. Often heating cycles may be utilized, such as, for example, 50° C. for 0.25–1.0 hours, 150°–200° C. for 0.5–2.0 hour and 175°–250° C. for 1.0–5.0 hours.

In some instances it may be preferred to react all of the chain extension agent with the resin, before curing is initiated. This will, in part, depend on the percent of chain extension agent to be incorporated.

It is observed that compositions according to the present invention are particularly advantageous, by comparison to the compositions of U.S. Pat. No. 4,684,678, when low percent chain extension agent is involved. Generally, this results from greater stability of the dihydroxy compound relative to the diamine.

The resin compositions of the invention are useful, for example: as structural adhesives; as films or protective coatings for various articles such as appliances; as impregnating and embedding materials for electrical components; and, in other uses, especially those wherein the operating temperature of the article or material is expected to be substantially elevated over room temperature.

The following examples illustrate specific embodiments and applications of the present invention. In all examples all parts and percents are by weight, and temperatures are in degrees Centigrade unless otherwise noted. In the examples, the overlap shear strength and floating roller peel strength of cured resins is given. This is as determined and described in ASTMD-3167-7b and MMM-A-132. Results are typically calculated in megapascals (MPa) and/or kilograms per centimeter (kg/cm). Peel strength and fracture energy relate to toughness and ductility in that the higher the peel strength and fracture energy, the greater the toughness of the material. This is interpreted herein as improved toughness or ductility.

EXAMPLE 1

The 9,9-bis(4-hydroxyphenyl)fluorene chain extension agent was prepared as follows:

A 500 ml 3-necked flask was equipped with a thermometer and means for introducing hydrogen chloride. To the flask were added: 90.0 g fluorenone; 282.0 g phenol; and, 3.1 g 3-mercaptopropionic acid. The mixture was heated to 55° C., with stirring.

Anhydrous hydrogen chloride (9.0 g) was flushed through the reaction flask over about a 30 minute period. The mixture was reacted for about 6 hours at 55° C., and was poured into 3 liters of methanol. The precipitate was collected and recrystallized from 1,2-dichloroethane to yield 130 g of white crystals, melting pt. 224.5°–225.5° C. Conventional analysis indicated that the crystals were 9,9-bis(4-hydroxyphenyl)fluorene. This material is referred to herein as monomer F.

EXAMPLE 2

Polymerization of an epoxy resin with 9,9-bis(4-hydroxyphenyl)fluorene.

To a resin flask fitted with a mechanical stirrer and a thermometer: 49 g of diglycidyl ether of bisphenol A, epoxide (equivalent weight 193–203) (Epon® 829, Shell Chemical Co.); and, 12.25 g 9,9-bis(4-hydroxyphenyl)fluorene (monomer F), prepared as above, were added. The mixture was heated to about 121° C. with continuous stirring, and was maintained at 115°-127° C. until a uniform mixture was obtained, i.e. 15-30 minutes. Polytetramethylene oxide diprimary amine, 12.5 g, Mw about 12,000 (HC 1101, 3M Co.), which had been melted at about 82° C. was added slowly to the reaction flask with stirring. The mixture was heated at about 177°-204° C. for about 120 minutes, was dumped and cooled at about 25° C. on silicone treated kraft paper, and was then dissolved in an 85-15 mixture of methyl ethyl ketone and toluene. This mixture is referred to herein as "Component A".

A "Component B" was prepared by milling together: 8.1 g of diglycidyl ether of bisphenol A, epoxide equivalent weight about 182-200 (Epon ® 828, Shell Chemical Co.); 4.5 g dicyandiamide (Aero ®, American Cyanamid Co.) and 1.8 g of a reaction product of toluenediisocyanate and dimethylamine (TDI Urea), on a 3-roll paint mill to a fineness of NS 4+. NS 4+ indicates a particle size ≦0.005 cm. The grinding is done until when film of the material is viewed at grazing incidence 5-10 particles within a 3 mm band appear through the surface.

The following were added to a double tite tin: 2.5 g Epon ® 828; 10.0 g condensation polymer of epichlorohydrin and Bisphenol A, epoxide equivalent weight about 230-280 (Epon ® 834, Shell Chemical Co.); 12.25 g 9,9-bis(4-hydroxyphenyl)fluorene; Component A; and, Component B. A double tite tin is a can having a friction top which seals against both an inside and outside lip, for example a typical paint can. The mixture was blended on a roller mill. For testing purposes a dry film was prepared by coating the mixture on a silicone treated polyethylene coated paper backing at a wet thickness of about 0.25 mm, with a drying of the film for about 60 minutes at about 24° C. followed by treatment for about 60 minutes at 66° C. in a fresh air circulating oven. This material is identified herein as "Film A".

The shear strength was determined according to Federal Specification MMM A-132A and peel strength was determined according to ASTM D-3167-7b using 2024 T-3 aluminum panels which had been first degreased by exposing panel to hot (about 138° C.) vapors of perchloroethylene for about 15-20 minutes, drying in air, immersing in alkaline degreaser ("Oakite Aluminum Cleaner 164", Oakite Products Inc., Berkeley Heights, N.J.) at about 82° C. for about 10 minutes, and rinsing with tap water and then deoxidized by immersing in a 71° C. bath of concentrated sulfuric acid, sodium dichromate and water for about 10 minutes (this is known as Forest Lake Products Etch Systems or FPL Etch System) followed by rinsing with deionized water and finally anodized by immersion in phosphoric acid at 22° C. with applied voltage of 15 volts for 20-25 minutes followed by rinsing with tap water (test for water break) and air drying 10 minutes at 22° C. and 10 minutes at 71° C. The total area to be bonded on both panels was primed with corrosion inhibiting primer for aluminum (3M EC-3924B).

Glass transition temperature was determined using a Differential Scanning Calorimeter (DSC). Test results are presented in Table I below.

For a comparative example, an adhesive film was analogously prepared using Bisphenol A in place of Monomer F. In particular, using an analogous procedure to that described above, a "Film B" was prepared using the following:

| Ingredient | | Amount |
|---|---|---|
| Component A: | Epon ® 829 | 44.3 g |
| | Bisphenol A | 8.0 |
| | HC-1101 | 12.4 |
| Component B: | Epon ® 828 | 8.1 g |
| | Dicyandiamid | 4.5 |
| | TDI Urea | 1.8 |
| | Epon ® 828 | 7.2 |
| | Epon ® 834 | 10.0 |
| | Bisphenol A | 8.0 |

TABLE I

| Property | Cure Temp. °C. | Test Temp. °C. | Test Results Film A | Film B |
|---|---|---|---|---|
| Tg(C) | | | 127.5 | 109.7 |
| Peel (kg/cm) | 135 | 22 | 13.0 | 12.9 |
| Overlap Shear (MPa) | 135 | 22 | 38.5 | 34.5 |
| " | | 94 | 26.1 | 18.8 |
| " | | 121 | 21.2 | 11.3 |
| " | | 149 | 13.7 | 3.0 |
| " | | 177 | 3.1 | 1.7 |

The data of Table I indicates the replacement of bisphenol A with Monomer F produces substantial increase in glass transition temperature (Tg), and hence a higher (improved) temperature performance, without a detraction from peel and shear strengths. That is, Monomer F results in higher glass transition temperature without any high density cross-linking. It is noted that at higher temperatures, improvement in shear strength (i.e. ductility) was observed.

EXAMPLE 3

Comparative Formulations

The following examples concern comparisons between formulations and demonstrate increased Tg and ductility attainable using epoxy compositions of the present invention.

Six epoxy compositions were prepared using the formulations outlined in Table II below, by mixing the combined ingredients in a container and heating in an oven for 150° C. for about 30 minutes, followed by heating at 177° C. for about 240 minutes. The six compositions are identified as A, B, C, D, E and "Ex. 2". "Ex. 2" is meant to refer to a composition as defined in Example 2 above. The cured resins were allowed to cool at 25° C., were cut into suitable sample sizes and were tested for fracture ene.gy, determined by compact tension according to ASTM E399-83. They were also tested for glass transition temperature (Tg), as measured by Differential Scanning Calorimeter. The results were as follows:

TABLE II

| | Epoxy[1] Eq. | Curative[2] NH Eq. | Monomer F[3] OH Eq. | Bisphenol A[4] OH Eq. | Toughener Wt. %[5] | Tg °C. | Fracture Energy J/m² |
|---|---|---|---|---|---|---|---|
| Comp. Ex. A | 0.5 | 0.5 | | | | 208 | 65 |
| Comp. Ex. B | 0.5 | 0.25 | | 0.25 | | 185 | 190 |

TABLE II-continued

|  | Epoxy[1] Eq. | Curative[2] NH Eq. | Monomer F[3] OH Eq. | Bisphenol A[4] OH Eq. | Toughener Wt. %[5] | Tg °C. | Fracture Energy J/m² |
|---|---|---|---|---|---|---|---|
| Comp. Ex. C | 0.5 | 0.25 |  | 0.25 |  | 137 | 180 |
| Comp. Ex. D | 0.5 | 0.5 |  |  | 5 | 204 | 120 |
| Ex. 2 | 0.5 | 0.25 | 0.25 |  | 5 | 183 | 1600 |
| Comp. Ex. E | 0.5 | 0.25 |  | 0.25 | 5 | 136 | 1850 |

[1] 2,2-bis[4(2,3-epoxypropoxy)phenyl]propane
[2] diaminodiphenylsulfone
[3] 9,9-bis(4-hydroxyphenyl)fluorene, OH eq. wt. 175
[4] OH eq. wt. 114
[5] KM 653, Rohm and Haas Co., Philadelphia, Pa. This substance is a core/shell copolymer of polymethacrylate rigid shell with an elastomeric core of cross-linked styrene/butadiene.

Table II demonstrates several embodiments of the invention. The addition of the diphenol in B and C demonstrates that the use of chain extension agent (Monomer F or bisphenol A) in place of a portion of the curative used in comparative Example A will significantly increase the toughness of the cured resin, see Comparative Examples B and C. However, when bisphenol A is used as a chain extension agent (Comparative Example C), a drastic and undesirable reduction in the glass transition temperature results. When the fluorene bisphenol, Monomer F, is used the toughness is increased as much as it was for bisphenol A; but a much higher glass temperature results.

The data also demonstrates the beneficial effects of the addition of a rubber toughening agent to the epoxy compositions. When a toughening agent was added to the highly cross-linked composition (Comparative Example D), the improvement in toughness energy was minimal. However, when the toughener was added to the chain-extended compositions, the effect on toughness was much more pronounced, see Example 2 and comparative Example E. Again, when Monomer F was used as the chain extension agent, the glass transition temperature is much higher than when bisphenol A was used.

Further General Statements of the Invention

From the previous examples, it will be understood that generally according to the present invention an improvement in cured product of an epoxy resin is accomplished through provision of a chain agent in the epoxy resin composition to be cured or cross-linked. Specifically, improvement is obtained through the utilization of a 9,9-bis(hydroxyphenyl)fluorene compound, as the chain extension agent. The improvements generally relate to improvement in glass transition temperature (i.e. raising of glass transition temperature) without substantial loss of toughness or ductility, or improvement in Tg without any substantial loss of toughness. In many instances both Tg and toughness can be improved.

Significantly, the present invention also involves improvement through provision, in addition to the chain extension agent, of a toughening agent in the resin composition. As illustrated in Table II, a significant overall improvement is achieved in both the 9,9-bis(hydroxyphenyl)fluorene and the toughening agent are present.

In addition to a method of improving the epoxy resin compositions, or the physical characteristics of cured epoxy resin compositions, the present invention also concerns a particular, preferred, epoxy resin composition according to the above general features.

It is to be understood that while certain embodiments of the present invention have been illustrated and described, the invention is not to be limited to the specific forms, compositions, systems or procedures herein described and/or illustrated.

What is claimed and desired to be secured by Letters Patent is as follows:

1. A method of improving a glass transition temperature and ductility of a cured product from an epoxy resin composition; said method including the step of:
   (a) providing in said epoxy resin composition an effective amount of a 9,9-bis(hydroxyphenyl)fluorene composition; said 9,9 bis(hydroxyphenyl)fluorene composition being provided in an amount of between about 0.09 and 0.7 hydroxy equivalents of 9,9-bis(hydroxyphenyl)fluorene composition per equivalent of reactive epoxide group in a polyepoxide component from which said resin composition is formed.

2. The method according to claim 1 including:
   (a) providing in said epoxy resin composition an amount of curative effective to generate cross-linking by means of reacting a substantial amount of those reactive epoxide groups in said polyepoxide component in excess of the amount of hydroxy equivalents of 9,9-bis(hydroxyphenyl)fluorene.

3. The method according to claim 2 wherein:
   (a) said curative includes an epoxide curing agent having at least 3 reactive sites for reaction with reactive oxirane groups in said polyepoxide component.

4. The method according to claim 1 wherein said 9,9-bis(hydroxyphenyl)fluorene composition includes at least one compound according to the formula:

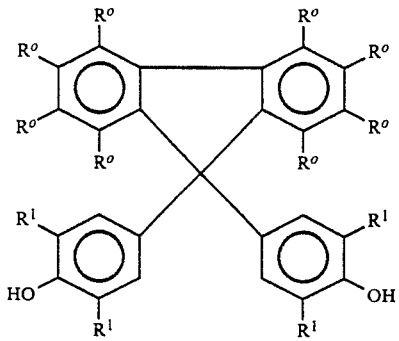

wherein: each $R^0$ is independently selected from hydrogen and other groups substantially inert to the polymerization of epoxide group-containing compounds; and, each $R^1$ is independently selected from hydrogen and other groups substantially inert to the polymerization of epoxide group-containing compounds.

5. The method according to claim 4 wherein: each $R^0$ is independently selected from the group comprising: hydrogen; the halogens; alkyl groups having 1–6 carbon atoms; phenyl; nitro; acetyl; and, trimethylsilyl; and, each $R^1$ is independently selected from the group comprising: hydrogen; phenyl; the halogens; and, alkyl groups having 1–6 carbon atoms.

6. A method of improving a glass transition temperature and ductility of a cured product from an epoxy resin composition; said method including the steps of:
   (a) providing in said epoxy resin composition an effective amount of a 9,9-bis(hydroxyphenyl)fluorene composition; and,
   (b) providing a toughening agent in said epoxy resin composition; said toughening agent being selected from the group consisting of: acrylic core/shell polymers; styrene-butadiene/methacrylate core/shell polymers; polyether polymers; carboxylated acrylonitrile/butadienes; carboxylated butadienes; and mixtures thereof.

7. A resin composition comprising:
   (a) a polyepoxide resin; and
   (b) between about 0.09 and 0.7 hydroxy equivalents of a 9,9-bis(hydroxyphenyl)fluorene composition.

8. A resin composition according to claim 7 including a curative effective to generate cross-linking by means of reacting a substantial amount of those reactive epoxide groups in said polyepoxide component in excess of the amount of hydroxy equivalents of 9,9-bis(hydroxyphenyl)fluorene.

9. The resin composition according to claim 7 including a curative comprising an epoxide curing agent having at least 3 reactive sites for reaction with reactive oxirane groups in said polyepoxide component.

10. A resin composition according to claim 7 including:
    (a) at least one elastomer toughening agent.

11. The resin composition according to claim 7 wherein said 9,9-bis(hydroxyphenyl)fluorene composition includes at least one compound according to the formula:

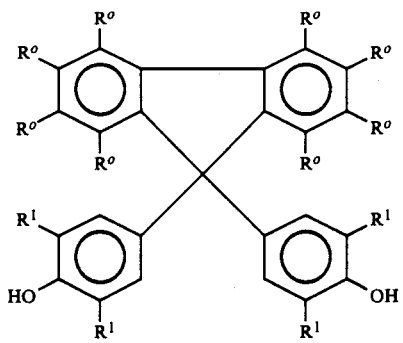

wherein: each $R^0$ is independently selected from hydrogen and other groups substantially inert to the polymerization of epoxide group-containing compounds; and each $R^1$ is independently selected from hydrogen and other groups substantially inert to the polymerization of epoxide group-containing compounds.

12. The resin composition according to claim 11 wherein: each $R^0$ is independently selected from the group comprising: hydrogen; the halogens; alkyl groups having 1–6 carbon atoms; phenyl; nitro; acetyl; and, trimethylsilyl; and, each $R^1$ is independently selected from the group comprising: hydrogen; phenyl; the halogens; and, alkyl groups having 1–6 carbon atoms.

13. A resin composition comprising:
    (a) a polyepoxide resin;
    (b) between about 0.05 and 0.9 hydroxy equivalents of a 9,9-bis(hydroxyphenyl)fluorene composition; and
    (c) at least one toughening agent selected from the group consisting of: acrylic core/shell polymers; styrene-butadiene/methacrylate core/shell polymers; polyether polymers; carboxylated acrylonitrile/butadienes; carboxylated butadienes; and, mixtures thereof.

14. A composition according to claim 13 including between about 0.09 and 0.7 hydroxy equivalents of 9,9-bis(hydroxyphenyl)fluorene composition.

15. A method of providing an improved cured resin; said method including steps of:
    (a) providing an epoxy resin composition including:
        (i) a curable polyepoxide resin;
        (ii) between 0.09 and 0.7 hydroxy equivalents of a 9,9-bis(hydroxyphenyl) fluorene composition per equivalent of reactive epoxide group in the polyepoxide resin; and
        (iii) a curing agent; and
    (b) curing said epoxy resin composition.

16. The method according to claim 15 wherein:
    (a) said 9,9-bis(hydroxyphenyl)fluorene composition includes at least one compound according to the formula:

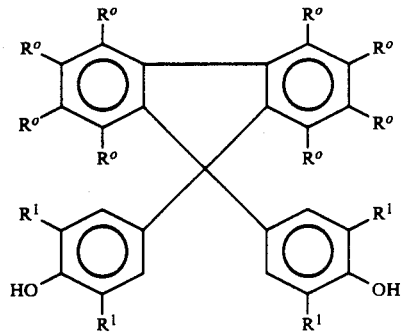

wherein: each $R^0$ is independently selected from hydrogen and other groups substantially inert to the polymerization of epoxide group-containing compounds; and each $R^1$ is independently selected from hydrogen and other groups substantially inert to the polymerization of epoxide group-containing compounds.

17. The method according to claim 16 wherein: each $R^0$ is independently selected from the group comprising: hydrogen; the halogens; alkyl groups having 1–6 carbon atoms; phenyl; nitro; acetyl; and, trimethylsilyl; and, each $R^1$ is independently selected from the group comprising: hydrogen; phenyl; the halogens; and, alkyl groups having 1–6 carbon atoms.

18. The method according to claim 15 wherein:
    (a) said epoxy resin includes an elastomer toughening agent.

19. An improved cured resin formed according to the method of claim 16.

20. An improved cured resin formed according to the method of claim 17.

21. An improved cured resin formed according to the method of claim 18.

22. An improved cured resin formed according to the method of claim 15.

23. A method of improving glass transition temperature and ductility of a cured product from an epoxy resin composition; said method including the step of:
(a) providing in said epoxy resin composition an effective amount of a 9,9-bis(hydroxyphenyl)fluorene composition; said 9,9-bis(hydroxyphenyl)fluorene composition being provided in an amount of between about 0.05 and 0.7 hydroxy equivalents of 9,9-bis(hydroxyphenyl)fluorene composition per equivalent of reactive epoxide group in a polyepoxide component from which said resin composition is formed.

24. A method of improving glass transition temperature and ductility of a cured product from an epoxy resin composition; said method including the step of:
(a) providing in said epoxy resin composition an effective amount of a 9,9-bis(hydroxyphenyl)fluorene composition; said 9,9-bis(hydroxyphenyl)fluorene composition being provided in an amount of about 0.05 to less than 0.9 hydroxy equivalents of 9,9-bis(hydroxyphenyl)fluorene composition per equivalent of reactive epoxide group in a polyepoxide component from which said resin composition is formed.

25. A method of improving a glass transition temperature and ductility of a cured product from an epoxy resin composition; said method including the steps of:
(a) providing in said epoxy resin composition an effective amount of 9,9-bis(hydroxyphenyl)fluorene composition; and,
(b) providing an elastomer toughening agent in said epoxy resin composition.

26. The method according to claim 24 wherein said epoxy resin composition includes between about 0.09 and 0.7 hydroxy equivalents of 9,9-bis(hydroxyphenyl)fluorene composition per equivalent of reactive epoxide group.

27. The method according to claim 24 wherein said 9,9-bis(hydroxyphenyl)fluorene composition includes at least one compound according to the formula:

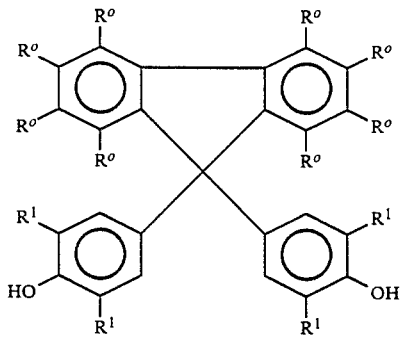

wherein: each $R^0$ is independently selected from hydrogen and other groups substantially inert to the polymerization of epoxide group-containing compounds; and, each $R^1$ is independently selected from hydrogen and other groups substantially inert to the polymerization of epoxide group-containing compounds.

28. A resin composition comprising:
(a) a polyepoxide resin; and,
(b) about 0.05 to less than 0.9 hydroxy equivalents of 9,9-bis(hydroxyphenyl)fluorene composition.

29. A resin composition according to claim 28 including about 0.05 to 0.7 hydroxy equivalents of the 9,9-bis(hydroxyphenyl)fluorene composition.

30. A resin composition comprising:
(a) a polyepoxide resin;
(b) between about 0.05 and 0.9 hydroxy equivalents of 9,9-bis(hydroxyphenyl)fluorene composition; and,
(c) an elastomer toughening agent.

31. A composition according to claim 30 including between about 0.09 and 0.7 hydroxy equivalents of 9,9-bis(hydroxyphenyl)fluorene composition.

32. A method of providing a cured product, from an epoxy resin composition, having improved glass transition temperature and ductility; said method including steps of:
(a) providing in said epoxy resin composition an effective amount of units according to the general formula:

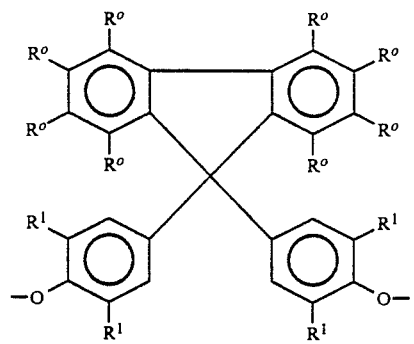

wherein: each $R^0$ and $R^1$ is independently selected from hydrogen and other groups substantially inert to polymerization of epoxide group-containing compounds; and,
(b) providing in said epoxy resin composition an elastomer toughening agent.

33. The method according to claim 32 wherein:
(a) each $R^0$ is independently selected from the group comprising: H; the halogens; linear and branched alkyl groups having 1-6 carbon atoms; phenyl groups; nitro groups; acetyl groups; and, trimethylsilyl groups; and,
(b) each $R^1$ is independently selected from the group comprising: H; phenyl; the halogens; and linear and branched alkyl groups having 1-6 carbon atoms.

34. The method according to claim 32 wherein the provided elastomer toughening agent is selected from the group consisting of: acrylic core/shell polymers; styrenebutadiene/methacrylate core/shell polymers; polyether polymers; carboxylated acrylonitrile/butadienes; carboxylated butadienes; and, mixtures thereof.

* * * * *